June 10, 1941.  R. S. HARRIS ET AL  2,245,339

PERFORATED MAP

Filed Feb. 23, 1939

INVENTOR.
Ralph S. Harris
Vernon W. Lapp
BY
ATTORNEYS

Patented June 10, 1941

2,245,339

UNITED STATES PATENT OFFICE 2,245,339

PERFORATED MAP

Ralph S. Harris, Kansas City, Mo., and Vernon W. Lapp, Lawrence, Kans.

Application February 23, 1939, Serial No. 257,830

1 Claim. (Cl. 35—40)

This invention relates to maps and means for fastening same to a base, and an object is to provide a fastening means for perforated sheet of material, the perforations of which are arranged in a special manner so as to set off an area on the sheet which designates a desired geographical territory and further areas of the sheet so as to outline regions within the aforesaid outlined territory.

The object of the instant invention includes specific structural details and the manner of employing a perforated map made in accordance with this invention will appear during the course of the following specification, referring to the accompanying drawing wherein.

Figure 1:
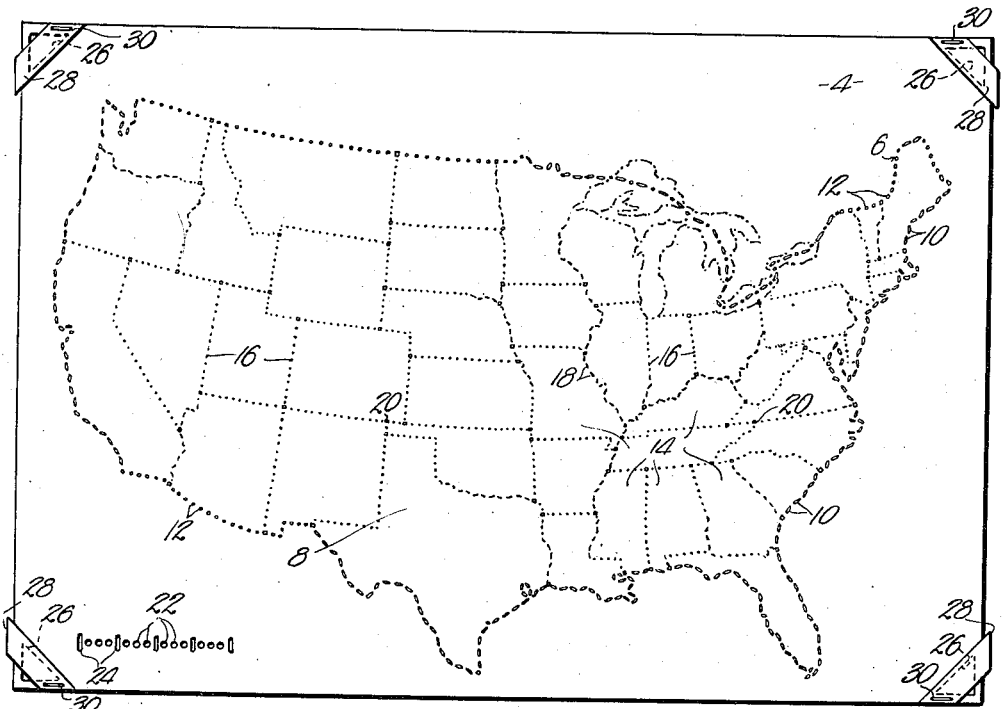
Figure 1 is a face view of a perforated map embodying this invention.
Figure 2:
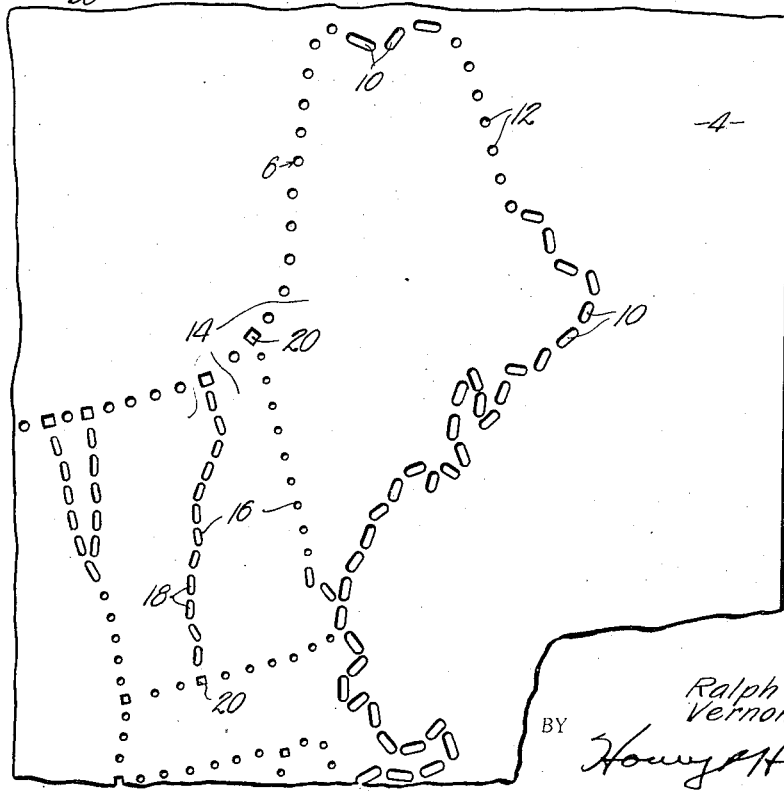
Fig. 2 is an enlarged detailed fragmentary view showing a portion of the face of said map.

The article of manufacture which embodies this invention is a map per se, and is likewise means for producing a map on the face of a blackboard or the like. Primarily, the perforated sheet 4 is to be used as a stencil sheet through which is formed a plurality of openings 6, certain of which openings are arranged to outline an area on sheet 4, designating a desired geographical territory 8, the character of the natural boundary of which may be readily determined by the student after the map has been formed on the face of a blackboard by the application of chalk dust or similar material. As an example, the map shown in the accompanying drawing, is that of the United States, and the territory 8 is the entire area within the main boundary lines along which the openings are positioned.

Certain of said openings 10 are oblong or different in shape than other openings 12, comprising the main boundary lines, and the character of openings 10 readily indicate that the natural boundary forming that part of the line is a water-way or a body of water. As an example, openings 10 may be oblong while the remaining openings of the main boundary line may be round.

When it is desired to test the ability of the student, oblong openings 10 may be blanked out by covering the same with a strip of tape, leaving only the remaining openings after the map on the blackboard has been formed, for the purpose of causing the student to complete the outline and properly designate the nature of the boundary. This manner of teaching geography is particularly useful where the sub-dividing lines are blanked out, as will hereinafter be described.

Territory 8 is subdivided into regions 14 by openings 16 that are arranged along the accurate boundary lines of these regions and the nature of opening 16 is such as to indicate the character of the boundary. If the boundary line between two adjacent regions 14 is formed by a river, for example, openings 16 are as shown at 18 and should be the same as openings 10 so that all boundary lines formed of a natural body of water appear the same.

It has been found in practice that the points of juncture between any of the boundary lines hereinabove mentioned, should be designated by an opening of a different form than any of the remaining openings formed through sheet 4. These openings 20 are here illustrated to be square while openings 10 and 18 are oblong to designate bodies of water and openings 12 are round to indicate an imaginary line. When using openings 20, boundary lines setting off regions 14 may be blanked out on sheet 4 so that they do not appear on the map produced by introducing chalk dust through the unrestricted openings and it remains for the student to complete any portion of the map which has been blanked out.

Where water-ways are designated by the specially formed openings 10 and 18, the nature of the boundary is indicated and the student has before him a map that may be completed by joining the openings but which is incomplete insofar as tributaries of the water-ways are concerned.

The scale for the map is designed by a series of openings 22 arranged in a straight line, the length of which represents a given distance. This line is divided into several parts by vertical, oblong perforations 24 intersecting the line. Through this scale designation, which is applied at the same time as the remaining portion of the map, the student is enabled to solve problems with satisfactory accuracy.

The sheet 4 should be equipped with means for securing the same to the face of a blackboard. Usually such boards are of slate or a composition precluding the use of thumb tacks and the securing means must be capable of holding the sheet close to the face of the board to insure proper application of the chalk dust. To accomplish the desired result, sheet 4 is provided with a window 26 located at each corner thereof.

Each tape 28 has a coating of pressure responsive adhesive on one side thereof and each is secured to sheet 4 so as to extend across one corner thereof. The attachment of each tape 28 is accomplished by stitching or by staples 30 and when tapes 28 are disposed, as illustrated in Fig. 1, the adhesive on the lower faces thereof grips the supporting blackboard through windows 26 and beneath the outwardly extended ends of the tapes.

Forming the windows as illustrated and positioning the strips as shown with respect thereto, establishes a support for the sheet 4 which will be positive in its action and preclude slipping. If slipping did occur, the nature of the openings would be lost to the chalk dust applied and one of the main objects of the invention lost.

But a few examples of the advantages arising from a perforated map made in accordance with this invention, have been set down and it will become obvious to one skilled in the art that intelligent manipulation will present a vast number of teaching advantages not heretofore employed. The map embodying the invention need not be confined to the United States but may be made to present the outline of any country of the world or any political subdivision thereof, and after the outlined map has been created on the face of the blackboard by dusting the face of sheet 4, it may have the spots of chalk joined in any suitable manner for the purpose of completing a particular problem presented to the student by the teacher.

Sheet 4 may be rolled and stored when not in use and it is contemplated that a complete set of maps of the world shall constitute a perforated sheet for each country.

Obviously, the specific form of any of the openings hereinabove described might be changed without departing from the spirit of the invention for it is but necessary to establish a difference between certain openings so that a relation is present that will have a designated meaning to the user.

Having thus described the invention, what is claimed as new and desired to be secured by Letters Patent is:

A device for producing outline maps on blackboards or the like, comprising a thin sheet of flexible material provided with a plurality of openings and a number of windows therethrough, two of said windows being positioned one adjacent each upper corner of said sheet, said openings being arranged to outline an area designating a geographical territory, and a strip of material having pressure responsive adhesive on one side thereof overlying each window respectively to engage the portion of the blackboard exposed therethrough when the sheet is flattened thereagainst to temporarily secure the sheet in place, said strips being long enough to extend across the window and beyond the edge of the sheet to further engage the blackboard.

RALPH S. HARRIS.
VERNON W. LAPP.